(12) United States Patent
Bhattacharyya

(10) Patent No.: US 12,536,304 B2
(45) Date of Patent: Jan. 27, 2026

(54) PORTABLE VERIFICATION CONTEXT

(71) Applicant: Capital One Services, LLC, McLean, VA (US)

(72) Inventor: Saurav Bhattacharyya, Brambleton, VA (US)

(73) Assignee: Capital One Services, LLC, McLean, VA (US)

( * ) Notice: Subject to any disclaimer, the term of this patent is extended or adjusted under 35 U.S.C. 154(b) by 249 days.

(21) Appl. No.: 17/935,389

(22) Filed: Sep. 26, 2022

(65) Prior Publication Data

US 2024/0104223 A1    Mar. 28, 2024

(51) Int. Cl.
*G06F 21/60* (2013.01)
*G06F 21/32* (2013.01)

(52) U.S. Cl.
CPC ............ *G06F 21/602* (2013.01); *G06F 21/32* (2013.01); *G06F 21/604* (2013.01)

(58) Field of Classification Search
None
See application file for complete search history.

(56) References Cited

U.S. PATENT DOCUMENTS

| | | | | |
|---|---|---|---|---|
| 7,600,123 B2 * | 10/2009 | Parupudi | ............... | H04L 9/3263 713/175 |
| 7,882,356 B2 * | 2/2011 | Klemets | ................ | H04L 9/3271 713/168 |
| 10,862,883 B1 * | 12/2020 | Bhattacharyya | .... | H04L 63/0861 |
| 11,457,082 B2 * | 9/2022 | Han | ........................ | H04W 4/50 |
| 2007/0162748 A1 * | 7/2007 | Okayama | ............ | H04L 63/0428 713/165 |
| 2010/0180327 A1 * | 7/2010 | Sheets | ................ | G06Q 20/3825 726/6 |
| 2014/0100929 A1 * | 4/2014 | Burgess | ................. | G06Q 30/02 705/14.17 |
| 2016/0299745 A1 * | 10/2016 | Zhang | ....................... | G06F 8/31 |
| 2019/0179585 A1 * | 6/2019 | True | ...................... | G06T 7/0002 |
| 2023/0008333 A1 * | 1/2023 | Mittal | ................... | H04L 63/107 |

* cited by examiner

*Primary Examiner* — Raqiul A Choudhury
(74) *Attorney, Agent, or Firm* — Harrity & Harrity, LLP

(57) ABSTRACT

In some implementations, a device may obtain verification information associated with an account based on a registration procedure associated with a service. The device may generate a verification context associated with the account based on the verification information, wherein the verification context is an object used to verify access attempts to the service. The device may store the verification context in connection with a unique identifier. The device may obtain a request to access the service, wherein the request is associated with the account, and wherein the request indicates an identifier. The device may perform a verification service associated with the request prior to passing the request to a service layer associated with the service, wherein the verification service includes verifying the request based on whether the identifier indicated by the request matches the unique identifier.

20 Claims, 7 Drawing Sheets

PORTABLE VERIFICATION CONTEXT

BACKGROUND

Verification or authentication is a security process that relies on the unique characteristics of individuals to verify that they are who they say they are. Verification systems compare received information or traits to stored, confirmed, authentic data in a database. If the received information or traits and stored data match, verification or authentication is confirmed. Typically, verification services are used to manage access to physical and digital resources, such as buildings, rooms, and computing devices. In contrast to identification, which uses characteristics (such as name, date of birth, and/or fingerprints or retina scans) to identify a person, verification is the use of characteristics or a person to verify that the person is who they claim to be.

SUMMARY

Some implementations described herein relate to a system for a portable verification context. The system may include one or more memories and one or more processors coupled to the one or more memories. The one or more processors may be configured to obtain verification information associated with an account based on a registration procedure associated with a service. The one or more processors may be configured to generate a verification context associated with the account based on the verification information. The one or more processors may be configured to encrypt the verification context with a unique identifier, wherein the unique identifier is generated by the system or is a device identifier of a device associated with the registration procedure. The one or more processors may be configured to obtain a service call associated with the service and the account, wherein the service call indicates a service call identifier associated with the service call. The one or more processors may be configured to perform a verification service associated with the service call prior to passing the service call to a service layer associated with the service, wherein the verification service includes verifying the service call based on comparing the service call identifier and the unique identifier. The one or more processors may be configured to selectively grant access to the service layer for the service call based on whether the service call identifier matches the unique identifier.

Some implementations described herein relate to a method for generating a portable verification context. The method may include obtaining, by a device, verification information associated with an account based on a registration procedure associated with a service. The method may include generating, by the device, a verification context associated with the account based on the verification information, wherein the verification context is an object used to verify access attempts to the service. The method may include storing, by the device, the verification context in connection with a unique identifier. The method may include obtaining, by the device, a request to access the service, wherein the request is associated with the account, and wherein the request indicates an identifier. The method may include performing, by the device, a verification service associated with the request prior to passing the request to a service layer associated with the service, wherein the verification service includes verifying the request based on whether the identifier indicated by the request matches the unique identifier.

Some implementations described herein relate to a non-transitory computer-readable medium that stores a set of instructions for a device. The set of instructions, when executed by one or more processors of the device, may cause the device to receive verification information associated with an account to register the verification information with a service. The set of instructions, when executed by one or more processors of the device, may cause the device to generate a verification context associated with the account based on the verification information, wherein the verification context includes a first device identifier of a client device associated with the account. The set of instructions, when executed by one or more processors of the device, may cause the device to obtain a request to access the service, wherein the request indicates a second device identifier. The set of instructions, when executed by one or more processors of the device, may cause the device to perform a verification service associated with the request prior to passing the request to a service layer associated with the service, wherein the verification service includes verifying the request based on whether the second device identifier matches the first device identifier. The set of instructions, when executed by one or more processors of the device, may cause the device to provide, to the service layer, information associated with the request to enable the service to be performed if the second device identifier matches the first device identifier and if the account is verified using the verification context.

DETAILED DESCRIPTION

Figure 1A:
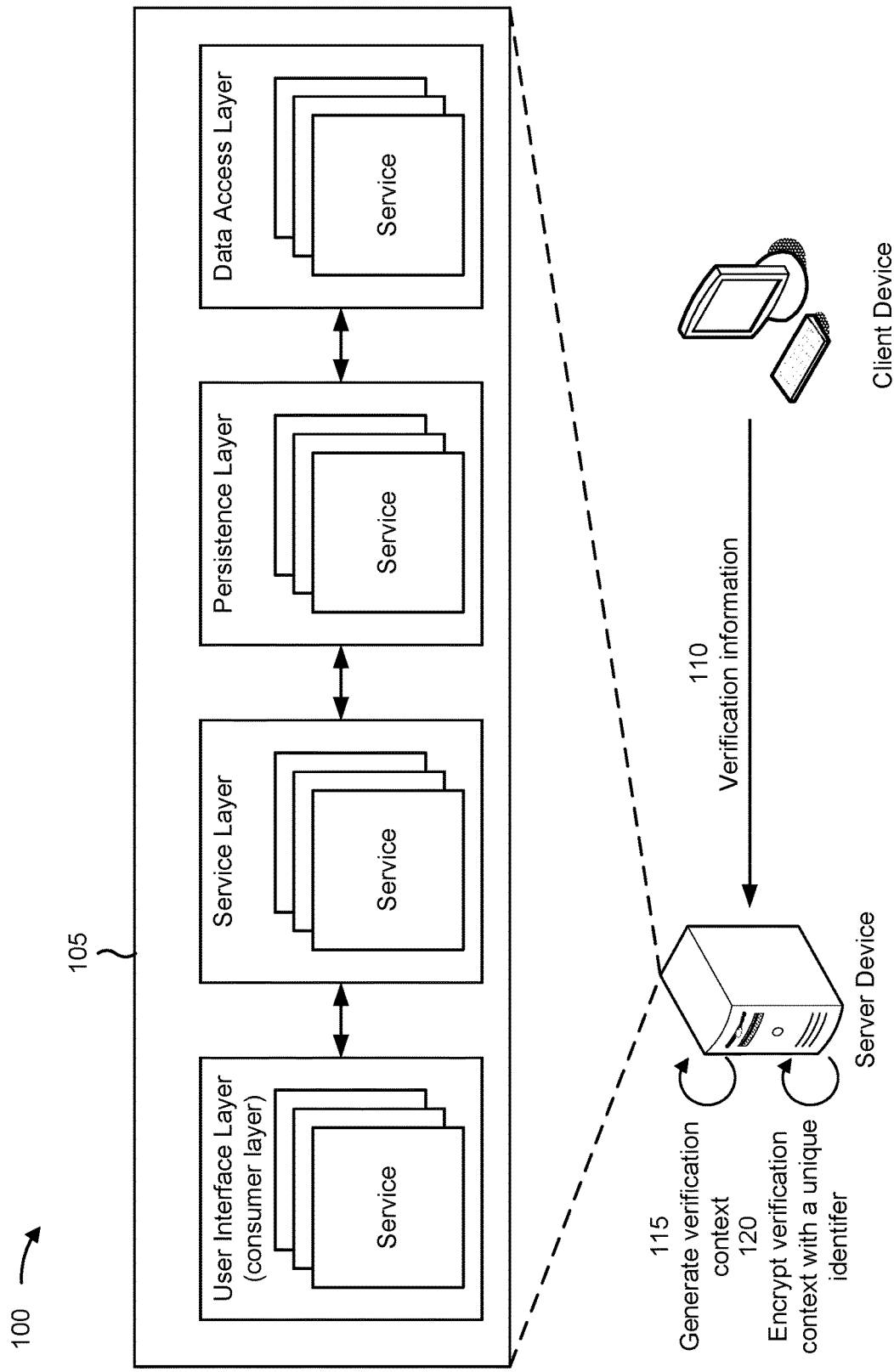
FIGS. 1A-1D are diagrams of an example associated with a portable verification context, in accordance with some embodiments of the present disclosure.

The following detailed description of example implementations refers to the accompanying drawings. The same reference numbers in different drawings may identify the same or similar elements.

Verification or authentication is an identification and/or security process that uses one or more unique identifiers (e.g., name, date of birth, authenticated image, social security number, and/or biometric data) of an authorized user (e.g., an account owner or a device owner) to authenticate a user trying to gain access to physical and/or digital resources (e.g., an account or a device). The process may include receiving information associated with the user trying to gain access and comparing the information to stored data of the unique identifier of the authorized user. If there is a sufficient match, then the user may be granted access to the physical and/or digital resources.

In some examples, the stored data may be included in a verification context. The verification context may define information that is needed by a system or a device to perform verification of a user associated with an account or device. The verification context may include one or more unique identifiers of the authorized user. For example, the verification context may be established as part of a registration procedure (e.g., the first time the authorized user accesses a device, service, and/or application). The verification context may also be referred to a verification signature, a verification fingerprint, and/or verification information, among other examples. The verification context may include a name (e.g., first name and last name), a date of birth, a social security number, a government issued identifier (e.g., driver's license identifier or a passport identifier), and/or biometric data, among other examples, of an authorized user. The verification context may be associated with a session identifier of a service. For example, the authorized user may access a service and may provide verification information to enable the verification context to be created.

However, each time the authorized user accesses the service, the authorized user may be required to perform the same verification steps (e.g., of providing information, such as a name, date of birth, and/or scanned biometric data) to be permitted to access the service. In other words, even if the verification context is associated with the same account or the same user, separate verification registrations or verification services may be required in order to enable verification via different platforms, services, or devices. This may consume significant processing resources, memory resources, and/or network resources associated with performing multiple registration procedures and/or with storing multiple verification contexts associated with the same user, among other examples, for enabling verification via multiple platforms, services, and/or devices.

Additionally, verification services may be performed at a service layer. From a protocol stack perspective, service layers are typically layered on top of existing network protocol stacks and provide value added services to client applications as well as other services. For example, service layers may be referred to as "middleware" service layers. For example, a service layer may be an abstraction over domain logic. The service layer may define an application's boundary with a layer of services that establishes a set of available operations and coordinates the response associated with each operation. For example, applications typically require different kinds of interfaces to the data stored by the application and logic (e.g., business logic) implemented by the applications. Despite their different purposes, these interfaces often need common interactions with the application to access and manipulate data and invoke the business logic. Encoding the business logic of the interactions separately in each module (e.g., for each interface) may consume processing resources and/or memory resources associated with duplication of encoding the logic. The service layer may be used to centralize the business logic inside a single layer associated with all of the interfaces associated with the application. Therefore, due to the centralized nature of the service layer, verification services for an application or service are typically performed within the service layer.

However, because the service layer may be accessed (e.g., via application programming interfaces (APIs) or other interfaces associated with an application or service) via a communication that is transmitted over a network (e.g., wireless network or a wired network). As a result, performing full verification procedures or services at the service layer may consume network resources and/or processing resources, among other examples associated with the communications over the network. Additionally, malicious actors may initiate attacks on the service or application. The attacks may include duplicating or emulating multiple devices and sending separate access requests or calls to the services from the duplicated or emulated devices. Because the request or calls may be allowed to pass to the service layer before verification is performed, significant network resources and/or bandwidth may be consumed before the application or service is enabled to identify that the request or calls are associated with an attack by a malicious actor. For example, even if the verification services performed at the service layer are able to identify the requests or calls as malicious, network resources, bandwidth, and/or processing resources may be consumed (or exhausted in some cases) associated with the attack.

Some techniques and implementations described herein enable a portable verification context. For example, the portable verification context may be tied or bundled with a unique identifier. This may enable the verification context to be obtained prior to a request or call being passed to the service layer of an application or service. For example, a call (e.g., an API call) associated with a service may include an identifier. A server device may obtain verification context (e.g., from a database associated with the service layer). The server device (e.g., before passing or providing the call to the service layer) may compare the identifier indicated in the call to the unique identifier associated with the verification context. If the identifier and the unique identifier match, then the server device may enable the call to proceed with a verification service procedure and/or may verify or authenticate the call (e.g., may pass the call to the service layer for additional processing and/or actions). If the identifier and the unique identifier do not match, then the server device may reject the call and may refrain from passing the call to the service layer.

In some implementations, the unique identifier may be an identifier of a client device associated with the verification context. For example, the client device may be associated with registering the verification context (e.g., with the server device). In other words, the verification context may be expanded to include specific to a given client device. In this way, each time an authorized user attempts to access the application or service from the server device, the authorized user may be verified based at least in part on the server device comparing the identifier of the client device associated with the access attempt to a device identifier associated with the verification context (e.g., without passing an API call to the service layer). This may conserve network resources, processing resources, and/or other computing resources that would have otherwise been used by passing an API call to the service layer and performing a full verification procedure at the service layer.

As another example, the unique identifier may be a randomly generated identifier that is generated as part of a registration procedure for the verification context. For example, the server device may encrypt the verification context with the unique identifier. In some implementations, the server device may provide the unique identifier to a client device upon an initial access of the service via the client device. In this way, the client device may provide the unique identifier to the server device in future requests to access the service. The server device may verify the request(s) to access the service using the unique identifier, as described in more detail elsewhere herein. In this way, the verification context may be portable across different client devices, such that an authorized user is not required to register the verification context each time the authorized user accesses the service using a different client device. This may conserve memory resources that would have otherwise been used to store multiple versions of the same, or similar, verification context (e.g., for respective client devices). Additionally, this may conserve network resources, processing resources, and/or computing resources, among other examples, that would have otherwise been used to register the verification context each time the authorized user accesses the service via a different client device.

Moreover, techniques and implementations described herein enable at least part of the verification service or procedure to be performed outside of the service layer of an application or service. For example, a verification service may include multiple steps. A first step, of the multiple steps, may be comparing an identifier provided in an API call to the unique identifier associated with the verification context (e.g., prior to passing information or the API call to the service layer). If the identifier provided in the API call does not match the unique identifier associated with the verification context, then the server device may deny an access attempt and refrain from passing information or the API call to the service layer. If the identifier provided in the API call matches the unique identifier associated with the verification context, then the server device may proceed with the verification service and/or may pass information or the API call to the service layer. In this way, at least a first step in the verification service outside of the service layer. In this way, if a malicious actor transmits a fraudulent request or call to access the service, the fraudulent request or call may be rejected prior to the fraudulent request or call being passed to the service layer. This may conserve network resources, network bandwidth, memory resources, and/or processing resources that would have otherwise been used providing information associated with the fraudulent request or call to the service layer, performing a full verification of the fraudulent request or call at the service layer, and rejecting the fraudulent request or call at the service layer, among other examples.

FIGS. 1A-1D are diagrams of an example 100 associated with a portable verification context. As shown in FIGS. 1A-1D, example 100 includes a server device and one or more client devices. These devices are described in more detail in connection with FIGS. 2 and 3.

As shown in FIG. 1A, the user device, the authentication device, and/or the server device may perform a registration procedure associated with a user account, via a first platform or service that is associated with a host. As used herein, "host" may refer to a network host, an internet host, or an internet protocol (IP) host, among other examples. For example, the host may be a server, computer, or another device connected to a computer network. The host may work as a server offering information resources, services, and applications to devices or other hosts on the network. In some implementations, the server device may be the host or may be a device associated with the host. As used herein, "platform" or "service" may refer to a computing platform or a digital platform. A platform or service is a discrete unit of functionality that can be accessed remotely and acted upon and updated independently, such as retrieving a credit card statement online, among other examples. For example, a platform or service may be an environment in which software is executed (e.g., the hardware and/or software on which a software application may be executed). For example, a platform may include hardware and/or software associated with a device, such as the user device. For example, a platform may be associated with an application executing on the user device (e.g., a mobile application or a native application), an operating system of the user device, a web browser, an application programming interface (API), and/or other program code. In some implementations, a platform may include hardware alone (e.g., an embedded system), a browser (e.g., a web browser), an application, a software framework, a cloud computing service, and/or a virtual machine, among other examples.

As shown by reference number 105, a service or platform may be supported by the server device. The service or platform may be associated with different layers. The layers may be associated with a service-oriented architecture (SOA). For example, an interface or communication protocol may be defined between different layers of a computer program intended to simplify the implementation and maintenance of software. The communication protocol stack may be associated with passing or providing information or commands between layers. For example, as shown in FIG. 1A, information or commands for an application, service, or platform may be passed from left to right between the layers. For example, the different layers may include a user interface layer, a service layer, a persistence layer, and/or a data access layer. In some implementations, the layers may include more layers, less layers, and/or differently arranged layers than those depicted in FIGS. 1A-1D. The user interface layer may also be referred to as a consumer layer, an enterprise layer, a business process layer, or a web layer. The service layer may also be referred to as a logic layer or a business logic layer.

With reference to a communication protocol stack, the user interface layer may sit above the service layer. The user interface layer may be associated with a front end of the service or platform. The user interface layer may contain the actual graphical user interface (GUI) modules and/or elements that can be interacted with by users. The user interface layer may be associated with high level embedding APIs to support integration with a web browser or mobile application, among other examples. The user interface layer may be the point at which users interact with the service or platform. For example, the user interface layer may be associated with the runtime and deployment infrastructure, programs, platforms, application servers, containers, runtime environments, packaged applications, virtual machines, among other examples, that are needed to support the service or platform.

The service layer may be located between the user interface layer and the persistence layer. The service layer may be a "middle" layer where services (both individual and composite services) that carry out business functions reside. The service layer may act as a bridge between the lower-level layers (e.g., the persistence layer and/or the data access layer) and the higher-level layers (e.g., the user interface layer). For example, the service layer may include business logic that is applied commonly for various services of the higher-level layers (e.g., the user interface layer). The service layer may support functional capabilities (e.g., services) that enable business capabilities, capabilities to enable the runtime execution of the service and the support of service virtualization, and/or policy document management, among other examples. In other words, the service may support services and/or capabilities that are associated with supporting other operations or services of a platform or application. For example, the user interface layer may use one or more to display data (e.g., on a client device), or to invoke a business process. The service layer provides data required by the user interface layer. The service layer may exist because more than just fetching and updating data is required by an application or platform (e.g., there is also additional business logic that is independent of the user interface layer).

The persistence layer may manage interactions with data associated with a user or an account (e.g., with the data access layer). For example, the persistence layer may facilitate a single, consistent, unified view of data. As an example, the persistence layer may support a service associated with creating a centralized view of master data (e.g., that is stored in different, distributed databases) as if the master data were in a single database. For example, the persistence layer may map structured objects (e.g., that are provided by the service layer) to persistence implementation to perform the data retrieval or updates. The persistence layer may accept structured data objects (SDOs) (e.g., from the service layer) which are transformed (e.g., mediated) into objects, such as physical SDOs. Physical SDOs may be stored in the data access layer.

The data access layer may be associated with access and/or storing data associated with a user and/or an account. The data access layer may also be referred to as a data layer. The data access layer may include one or more databases (e.g., a single database or multiple distributed databases). The data access layer may be used by other layers or services to access and manipulate data within one or more databases.

As described elsewhere herein, verification or authentication information may be stored and/or performed in the service layer of an application, service, or platform. "Verification" and "authentication" may be used interchangeably herein. As shown by reference number 110, the server device may obtain, from a client device, verification information associated with an account based on performing a registration procedure associated with a service, application, or platform. The registration procedure may be associated with registering an account with the service, application, or platform. For example, the verification information may include a name of a user associated with an account, personally identifiable information of the user (e.g., date of birth and/or social security number), one or more identification documents (e.g., passport and/or driver's license) associated with the user, and/or biometric information of the user (e.g., fingerprint scan, face scan, retina scan, and/or iris scan), among other examples. For example, the verification information may include any information that can be used to verify that a user is who they claim to be. The verification information may be passed from the user interface layer to the service layer.

As shown by reference number 115, the server device may generate a verification context associated with the account based on the verification information. The verification context may be an object (e.g., a data object or data block) that is used to verify access attempts to the service. The verification context may be an extensible markup language (XML) object. For example, the server device may compile the verification information and store the verification information in a data object or a data block that is associated with the account. In some implementations, the verification context may be an object with a set of fields. Each field, of the set of fields, may be associated with information (e.g., verification information) that can be used to verify the account or a user of the account. For example, the set of fields may include one or more fields associated with an account number, a name, a phone number, a date of birth, an image of a user, an image of a government issued identification card or document (e.g., an image of a driver's license or passport), and/or biometric scan data, among other examples. In some implementations, the verification context may include security questions and corresponding responses. In some implementations, the verification context may be updated periodically and/or when new verification information is provided to the server device.

As shown by reference number 120, the server device may encrypt the verification context with a unique identifier. For example, the server device may use the unique identifier to perform an encryption of the verification context. This may enable the unique identifier to be used to access and/or authenticate an access attempt (e.g., if a request to access the service or platform indicates the unique identifier, then the server device may determine that the request is verified or authentic). In some implementations, the unique identifier may be generated by the server device. For example, the unique identifier may be randomly generated by the server device. In some implementations, the unique identifier may be a public key in a public-private key pair. For example, the verification context may be encrypted using the public-private key pair. The public key may be provided as part of a request (e.g., a service call or an API call) to facilitate verification of the request, as described in more detail elsewhere herein.

In some implementations, the unique identifier may be an identifier of the client device that is associated with the registration procedure. For example, the verification context may include the identifier of the client device. In other words, a bound of the verification context may be expanded to include a specific client device. In this way, the identifier of the client device may be used to authenticate or verify an access attempt (e.g., by comparing a device identifier of a client device associated with the access attempt to the identifier associated with the verification context).

For example, the verification context may include the unique identifier, a name of a user associated with the account, personally identifiable information of the user, one or more identification documents associated with the user, and/or biometric information of the user, among other examples. In some implementations, the server device may store the verification context in connection with the unique identifier. For example, the server device may store the verification in a data structure such that the unique identifier is mapped to the verification context in the data structure. In some implementations, the verification context may be stored in the service layer. In some other implementations, the verification context may be stored in the data access layer.

In some implementations, the server device may provide, to the client device, an indication of the unique identifier as part of the registration procedure. For example, in cases where the unique identifier is generated by the server device, the server device may provide an indication of the unique identifier to the client device. This may enable the client device to provide an indication of the unique identifier in future calls or requests to access data associated with the service or platform. For example, the unique identifier may be a public key, as described elsewhere herein. The server device may provide an indication of the public key to the client device. The client device may store an indication of the unique identifier that is associated with the verification context.

Figure 1B:
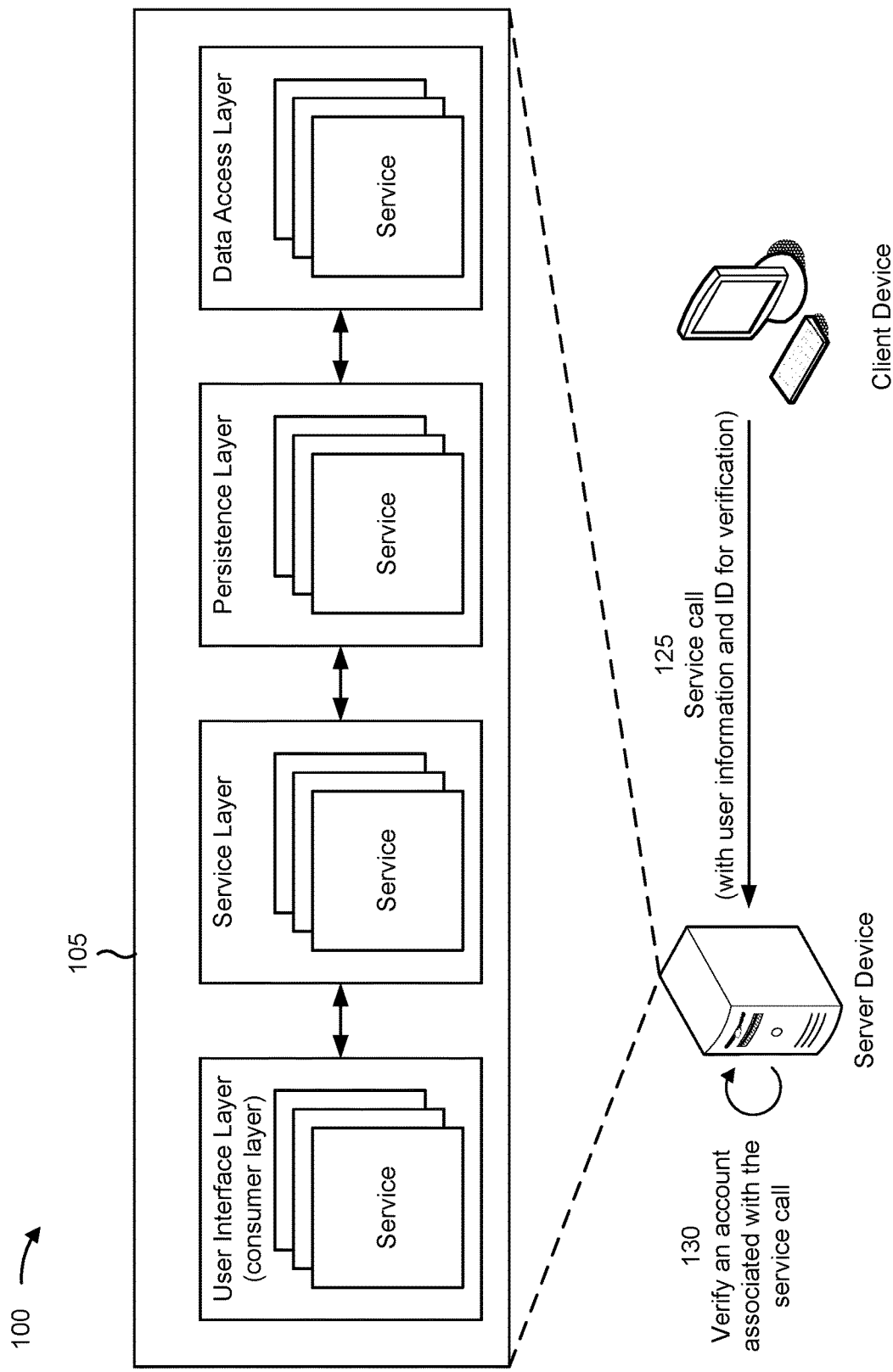

As shown in FIG. 1B, a client device (e.g., the same client device as depicted in FIG. 1A or a different client device) may attempt to access data associated with the service or platform. For example, a user may interact with a user interface (e.g., provided by or supported by the user interface layer) to request access to the data (e.g., that is stored in the data access layer) associated with the service or platform. For example, the user may provide a login request to an account via the user interface. As shown by reference number 125, the client device may provide (e.g., transmit), and the server device may obtain (e.g., receive), a request to access the service. The request may be a service call (e.g., an API call to access the service). The request may be associated with the account (e.g., the account that is associated with the registration procedure described above in connection with FIG. 1A). For example, the request may indicate an identifier of the account, an account number, and/or a username associated with the account (e.g., an email address or another username).

In some implementations, the request may indicate an identifier associated with the request (e.g., a service call identifier associated with the service call). In some implementations, the identifier may be a device identifier of the client device. In some implementations, the identifier may be another unique identifier (e.g., other than a device identifier). For example, the identifier may be a public key or other cryptographic key. As described elsewhere herein, the identifier indicated in the request or service call may be associated with a portable verification context (e.g., portable in that the verification context may be applied to requests or calls from different devices, different sessions, and/or different interfaces). For example, in some implementations, the request or service call may be obtained by the server device from a different client device than the client device associated with the registration procedure. As another example, the registration procedure (e.g., described above in connection with FIG. 1A) may be associated with a first session with the service or platform. The service call or request may be associated with a second, subsequent session (e.g., a later session) with the service or platform.

In some implementations, the service call or request may indicate information (e.g., user information) associated with the account. For example, the service call or request may include information provided by a user for the purpose of verifying the service call or request. For example, the user information may include a name (e.g., a first name and last name), an image (e.g., an image of the user, an image of a identification card or document, or another image), and/or biometric scan data, among other examples. For example, the client device may obtain the user information (e.g., via user input or a component of the client device, such as a camera or biometric scanner).

In some implementations, the client device may determine an identifier to be associated with the service call or the request. For example, the client device may determine that the device identifier of the client device is to be provided with the service call or the request to facilitate verifying the service call or request. As another example, the client device may determine that the identifier provided to the client device by the server device (e.g., the unique identifier generated by the server device as described in more detail elsewhere herein) is to be provided with the service call or the request to facilitate verifying the service call or request.

As shown by reference number 130, the server device may verify an account associated with the service call or request based on the information provided with the service call or request. For example, the server device may perform a verification service associated with the request prior to passing the request to the service layer associated with the service or platform, as described in more detail elsewhere herein. In some implementations, the verification service includes verifying the request or service call based on whether the identifier (e.g., provided in the request or service call) matches the unique identifier associated with the verification context.

For example, the server device may receive or retrieve the verification context from a storage location based on obtaining the request or service call. For example, the server device may query a layer (e.g., the service layer, the persistence layer, or the data access layer) using the user information and/or the identifier indicated by the request or service call (e.g., to obtain the verification context). For example, the server device may obtain the verification context from the service layer. In other examples, the verification context may be stored and/or received from outside of the service layer (e.g., such that no information needs to be provided to the service layer to initiate and/or perform the verification service).

Figure 1C:
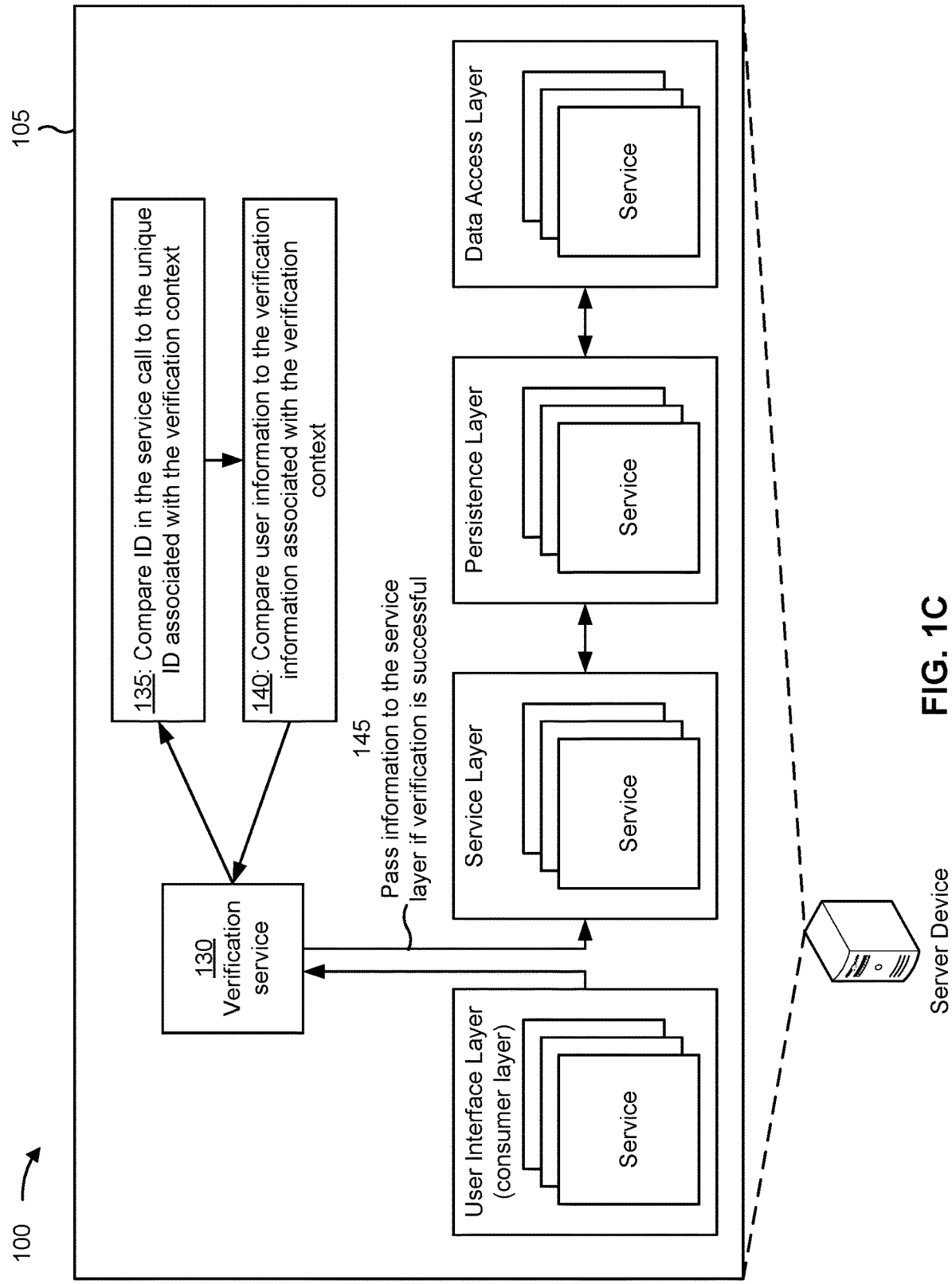

As shown in FIG. 1C, the verification service may be performed outside of the service layer. For example, in a typical communication flow, the service call or request may be passed from the user interface layer to the service layer. The service layer may perform the verification service (e.g., to verify or authenticate the request or service call). However, to reduce unnecessary network resources associated with providing information to the service layer, at least part of the verification service may be performed prior to information being passed to the service layer. In other words, the server device may perform a verification service associated with the service call prior to passing the service call to the service layer associated with the service or platform.

As shown by reference number 135, the verification service may include verifying the service call or request based on comparing the identifier associated with the service call and the unique identifier that is associated with the verification context. For example, the server device may search or query for a verification context that is associated with the identifier. If a verification context is identified (e.g., based on the search or query), then the server device may determine that the identifier provided by the service call or request matches the unique identifier associated with the verification context. If no verification context is identified (e.g., based on the search or query), then the server device may determine that the identifier provided by the service call or request does not match a unique identifier associated with the verification context (e.g., and the server device may deny access to the service or platform for the service call, as described in more detail below).

As another example, the server device may identify the verification context based on user information provided in the service call or request. For example, the server device may search or query for a verification context associated with an account identifier, a name, and/or other user information indicated by the service call. The server device may identify the unique identifier associated with the obtained verification context. The server device may compare the unique identifier to the identifier indicated by the service call. If the identifier and the unique identifier match (e.g., are the same), then the server device may proceed with the verification service. If the identifier and the unique identifier do not match (e.g., are not the same), then the server device may deny access to the service or platform for the service call, as described in more detail below.

As another example, the server device may attempt to decrypt the verification context using the identifier provided by the service call or request. For example, the identifier may be a public key. The server device may use the public key to attempt to decrypt the verification context. If the server device successfully decrypts the verification context using the identifier, then the server device may determine that the identifier provided by the service call or request matches the unique identifier associated with the verification context. If the server device is unable to successfully decrypt the verification context using the identifier, then the server device may determine that the identifier provided by the service call or request does not match a unique identifier associated with the verification context (e.g., and the server device may deny access to the service or platform for the service call, as described in more detail below).

For example, the verification service may include multiple steps. Comparing the identifier associated with the service call or request and the unique identifier of the verification context may be a first step that is performed prior to any other steps of the multiple steps. In this way, if the identifier indicated by the service call or request does not match the unique identifier, then the server device can quickly reject the service call or deny access to the service or platform (e.g., before passing or transmitting information to the service layer). This may conserve resources that would have otherwise been used to pass or transmit information to the service layer to facilitate the verification services being performed. Moreover, this may conserve network resources, processing resources, and/or memory resources that would have otherwise been used to perform all of the multiple steps associated with the verification service when the identifier indicated by the service call or request does not match the unique identifier.

For example, the server device may proceed with the verification service if the identifier provided in the service call or the request matches the unique identifier associated with the verification context. In some implementations, if the identifier provided in the service call or the request matches the unique identifier associated with the verification context, then the server device may determine that the service call or request is verified. In other words, if the identifier provided in the service call or the request matches the unique identifier associated with the verification context, then the server device may not perform additional verification procedures. For example, if the identifier provided in the service call or the request matches the unique identifier associated with the verification context, this may indicate that the service call or request is originating at a device that has been previously used to access the service or platform by an authorized user (e.g., because the client device has access to the unique identifier established or generated during the registration procedure, as described elsewhere herein). Therefore, the server device may not perform additional verification procedures and may pass or transmit information associated with the service call or request to the service layer for additional processing (e.g., as described below).

In other implementations, if the identifier provided in the service call or the request matches the unique identifier associated with the verification context, then the server device may perform additional verification procedures to verify the service call or request (e.g., the server device may only perform the additional verification procedures if identifier provided in the service call or the request matches the unique identifier associated with the verification context, then the server device may not perform additional verification procedures). For example, as shown by reference number 140, the server device may compare the information indicated by the service call and the verification information associated with the verification context based on determining that the identifier associated with the service call matches the unique identifier.

For example, the server device may determine whether user information indicated by the service call or request sufficiently matches verification information associated with the verification context. In some examples, depending on the context, "sufficiently match" may refer to an actual match or may refer to a quantity of data points that match between the verification information and the user information satisfying a threshold. For example, if the user information is a name, then the name may sufficiently match the verification information if the name provided in the service call is the same as a name stored in connection with the verification context. As another example, if the user information is scanned biometric information, then the server device may determine whether the scanned biometric information or data sufficiently matches the stored biometric information data (e.g., if a quantity of minutiae points between the scanned biometric data and the stored biometric data that are the same satisfy a threshold). As another example, the server device may input user information indicated by the service call to a model (e.g., an image recognition model or an image analysis model). The server device may determine that there is a sufficient match if the model outputs an indication that there is a match.

As shown by reference number 145, the server device may enable information to be passed to the service layer if verification is successful. For example, if the server device determines that the identifier indicated by the service call matches the unique identifier associated with the verification context and/or determines that user information indicated by the service call or request sufficiently matches verification information associated with the verification context, then the server device may pass or transmit information associated with the service call to the service layer for additional or further processing. If the server device determines that the identifier indicated by the service call does not match the unique identifier associated with the verification context and/or determines that the user information indicated by the service call or request does not sufficiently match the verification information associated with the verification context, then the server device may refrain from passing or transmitting information associated with the service call to the service layer. This may conserve network resources, processing resources, and/or computing resources that would have otherwise been using passing or transmitting information to the service layer for a service call that would ultimately be unverified and not permitted to access data (e.g., from the data access layer).

Additionally, by associating or bounding the verification context to the unique identifier, the verification service may be performed without performing another registration procedure with a different client device based on the different client device indicating the identifier in the service call. For example, a full registration procedure may not need to be performed when a user accesses the service or platform via different client devices so long as the different client devices have access to the unique identifier. As a result, the verification context may be portable across different client devices and across different sessions associated with the user. This may conserve time, network resources, memory resources, and/or processing resources that would have otherwise been used to perform a full registration procedure on each client device (e.g., for storing a verification context for the same user and/or the same account).

Figure 1D:
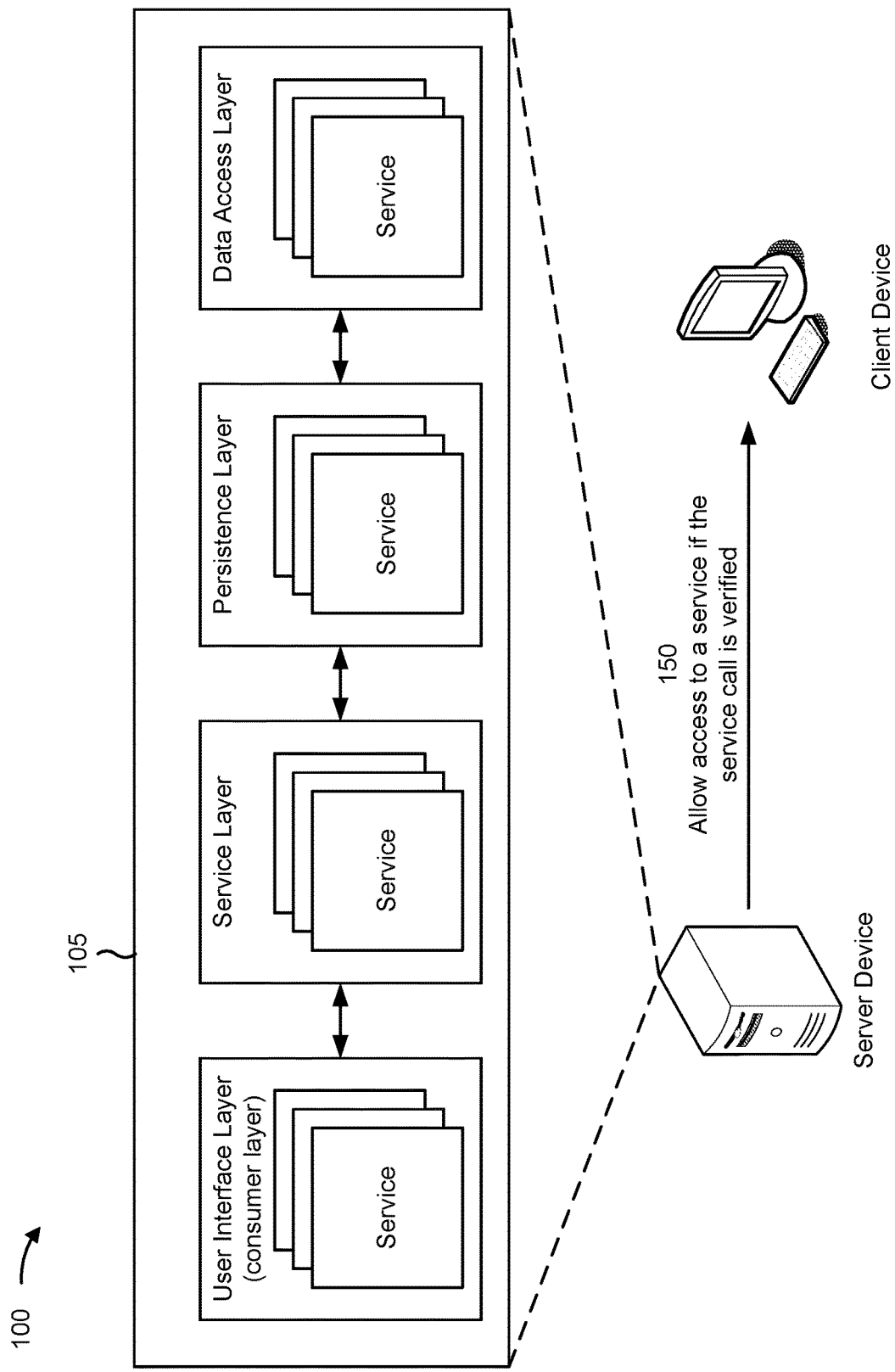

As shown in FIG. 1D, and by reference number 150, the server device may selectively grant access to the service layer for the service call based on whether the identifier associated with the service call matches the unique identifier. For example, the server device may enable the client device may access data associated with the service or platform (e.g., stored by the data access layer) based on whether the identifier associated with the service call matches the unique identifier and/or on successfully verifying the user information, as described elsewhere herein. For example, the server device may enable the service layer, the persistence layer, the data access layer, and/or other layers associated with the service or platform to process the service call or request based on successfully verifying that the service call or request indicates the unique identifier associated with the verification context. In some implementations, this may indicate that the client device associated with the service call or request is the same device that was associated with the registration procedure (e.g., where the unique identifier is the device identifier of the client device). In other examples, this may indicate that the client device associated with the service call or request is associated with an authorized user (e.g., because the client device was enabled to previously obtain the unique identifier).

For example, the server device may grant access to the service layer for the service call if the identifier associated with the service call matches the unique identifier and/or if the information indicated by the service call sufficiently matches the verification information. This may enable the service layer to process the service call, may enable the persistence layer to query a database associated with the data access layer, and/or may enable the data access layer to obtain data to be provided to the client device. For example, the server device may provide the data to the client device based on the identifier associated with the service call matching the unique identifier and/or the information indicated by the service call sufficiently matching the verification information.

Alternatively, the server device may deny access to the service layer for the service call if the identifier associated with the service call does not match the unique identifier or if the information indicated by the service call does not sufficiently match the verification information. For example, the server device may not allow information to be passed or provided to the service layer based on the identifier associated with the service call not matching the unique identifier or the information indicated by the service call not sufficiently matching the verification information.

As indicated above, FIGS. 1A-1D are provided as an example. Other examples may differ from what is described with regard to FIGS. 1A-1D.

Figure 2:
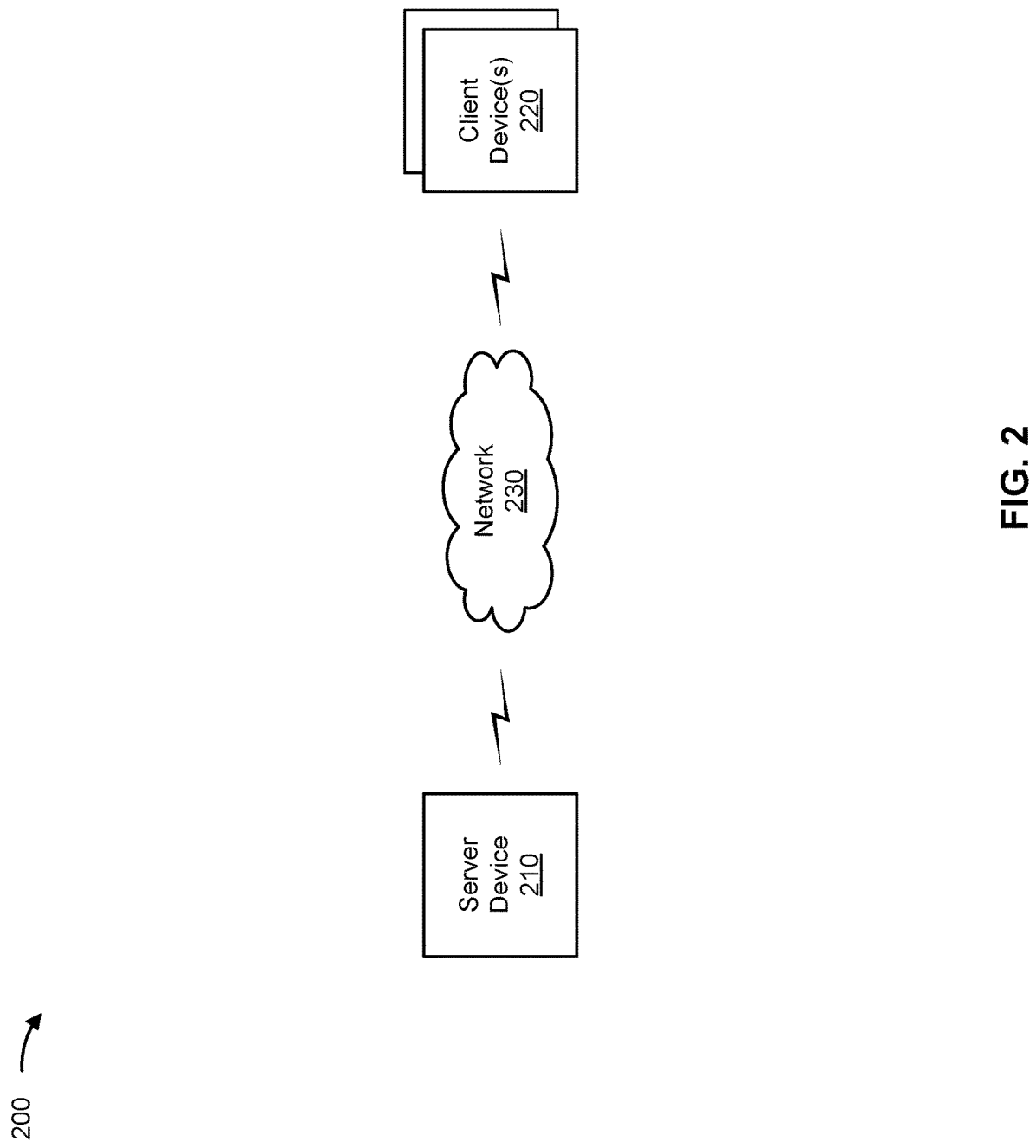
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a server device 210, one or more client devices device 220, and a network 230. Devices of environment 200 may interconnect via wired connections, wireless connections, or a combination of wired and wireless connections.

The server device 210 may include one or more devices capable of receiving, generating, storing, processing, providing, and/or routing information associated with a portable verification context, as described elsewhere herein. For example, the server device 210 may perform verification services based on the portable verification context, as described in more detail elsewhere herein. The server device 210 may include a communication device and/or a computing device. For example, the server device 210 may include a server, such as an application server, a client server, a web server, a database server, a host server, a proxy server, a virtual server (e.g., executing on computing hardware), or a server in a cloud computing system. In some implementations, the server device 210 may include computing hardware used in a cloud computing environment.

In some implementations, the server device 210 may be a cloud computing system. For example, the server device 210 may include computing hardware, a resource management component, a host operating system (OS), and/or one or more virtual computing systems. The cloud computing system may execute on, for example, an Amazon Web Services platform, a Microsoft Azure platform, or a Snowflake platform. The resource management component may perform virtualization (e.g., abstraction) of computing hardware to create the one or more virtual computing systems. Using virtualization, the resource management component enables a single computing device (e.g., a computer or a server) to operate like multiple computing devices, such as by creating multiple isolated virtual computing systems from computing hardware of the single computing device. In this way, computing hardware can operate more efficiently, with lower power consumption, higher reliability, higher availability, higher utilization, greater flexibility, and lower cost than using separate computing devices.

The computing hardware may include hardware and corresponding resources from one or more computing devices. For example, the computing hardware may include hardware from a single computing device (e.g., a single server) or from multiple computing devices (e.g., multiple servers), such as multiple computing devices in one or more data centers. The resource management component may include a virtualization application (e.g., executing on hardware, such as the computing hardware) capable of virtualizing computing hardware to start, stop, and/or manage one or more virtual computing systems. A virtual computing system may include a virtual environment that enables cloud-based execution of operations and/or processes described herein using the computing hardware. A virtual computing system may include a virtual machine, a container, or a hybrid environment that includes a virtual machine and a container, among other examples.

The client device 220 may include one or more devices capable of receiving, generating, storing, processing, and/or providing information associated with a portable verification context, as described elsewhere herein. The client device 220 may include a communication device and/or a computing device. For example, the client device 220 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 230 may include one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
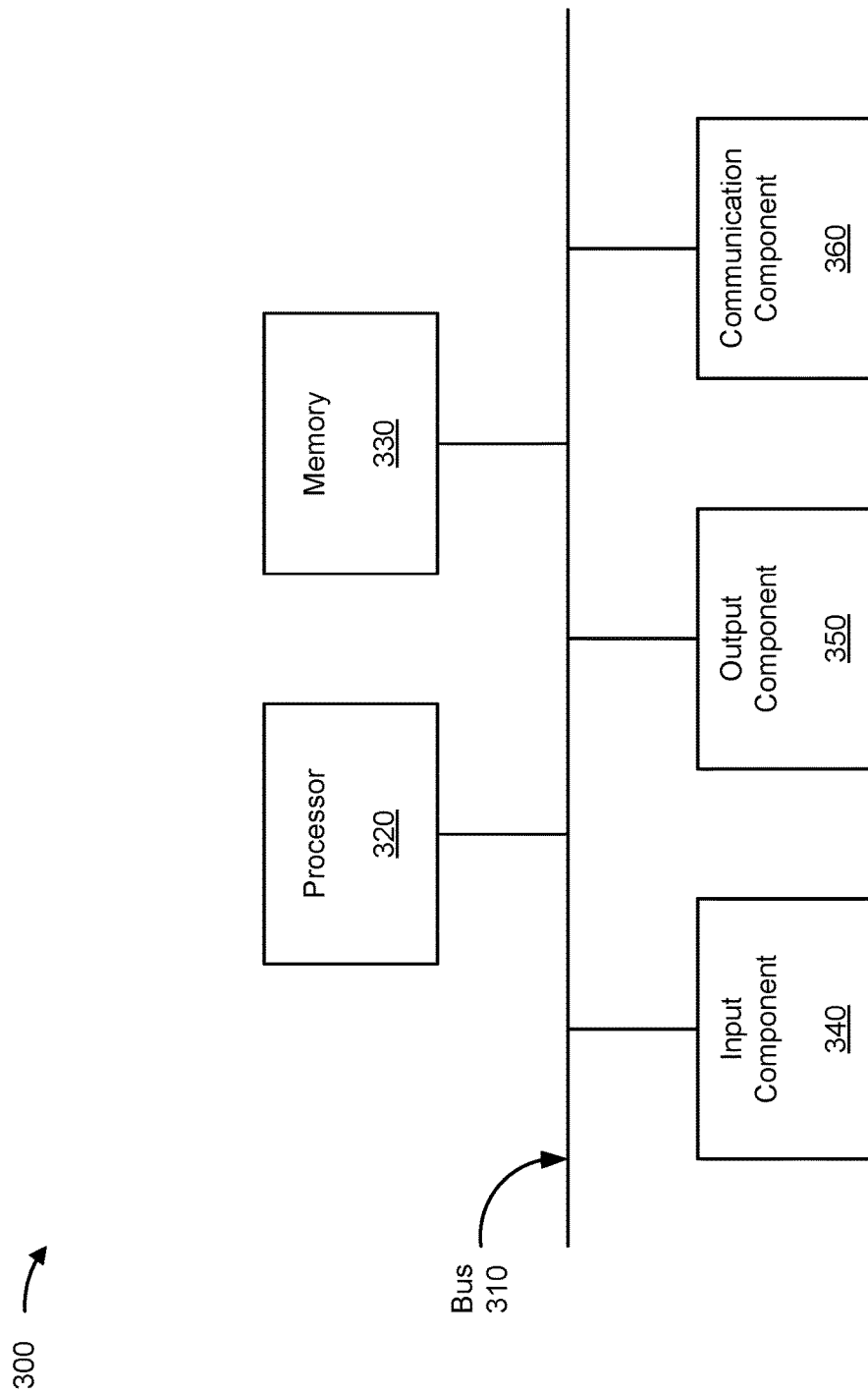
FIG. 3 is a diagram of example components of a device associated with portable verification context, in accordance with some embodiments of the present disclosure.

FIG. 3 is a diagram of example components of a device 300 associated with portable verification context. Device 300 may correspond to the server device 210 and/or the client device 220. In some implementations, the server device 210 and/or the client device 220 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
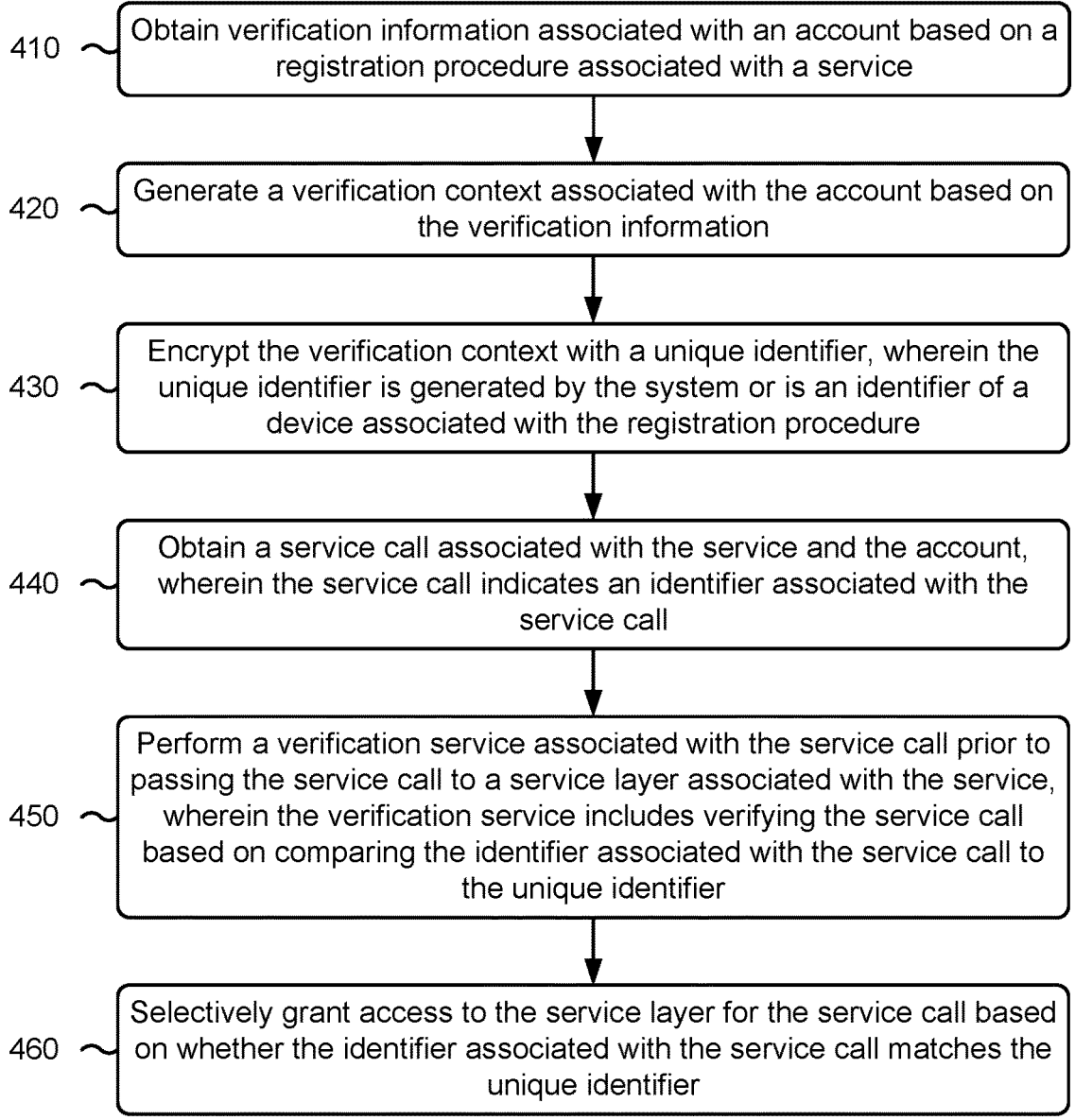
FIG. 4 is a flowchart of an example process associated with a portable verification context, in accordance with some embodiments of the present disclosure.

FIG. 4 is a flowchart of an example process 400 associated with a portable verification context. In some implementations, one or more process blocks of FIG. 4 may be performed by the server device 210. In some implementations, one or more process blocks of FIG. 4 may be performed by another device or a group of devices separate from or including the server device 210, such as the client device 220. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining verification information associated with an account based on a registration procedure associated with a service (block 410). For example, the server device 210 (e.g., using processor 320 and/or memory 330) may obtain verification information associated with an account based on a registration procedure associated with a service, as described above in connection with reference number 110 of FIG. 1A. As an example, the server device 210 may perform a registration procedure for an account that is accessing a service or platform. The registration procedure may include a client device 220 providing the verification information to the server device 210.

As further shown in FIG. 4, process 400 may include generating a verification context associated with the account based on the verification information (block 420). For example, the server device 210 (e.g., using processor 320 and/or memory 330) may generate a verification context associated with the account based on the verification information, as described above in connection with reference number 115 of FIG. 1A. As an example, the server device 210 may compile the verification information into fields of a data object to generate the verification context.

As further shown in FIG. 4, process 400 may include encrypting the verification context with a unique identifier, wherein the unique identifier is generated by the system or is an identifier of a device associated with the registration procedure (block 430). For example, the server device 210 (e.g., using processor 320 and/or memory 330) may encrypt the verification context with a unique identifier, wherein the unique identifier is generated by the system or is a device identifier of a device associated with the registration procedure, as described above in connection with reference number 120 of FIG. 1A. As an example, the server device 210 may generate the unique identifier (e.g., may generate a random identifier or a public key) or may identify the device identifier of the client device 220 (e.g., that is associated with the registration procedure) and may encrypt the verification context using the unique identifier.

As further shown in FIG. 4, process 400 may include obtaining a service call associated with the service and the account, wherein the service call indicates a service call identifier associated with the service call (block 440). For example, the server device 210 (e.g., using processor 320 and/or memory 330) may obtain a service call associated with the service and the account, wherein the service call indicates the service call, as described above in connection with reference number 125 of FIG. 1B. As an example, the server device 210 may obtain the service call from the same client device 220 that is associated with the registration procedure or a different client device 220. The service call may indicate the service call identifier, which may be reference the device identifier of the client device 220 that provided the service call or may reference another identifier, such as a public key, among other examples.

As further shown in FIG. 4, process 400 may include performing a verification service associated with the service call prior to passing the service call to a service layer associated with the service, wherein the verification service includes verifying the service call based on comparing the service call identifier and the unique identifier (block 450). For example, the server device 210 (e.g., using processor 320 and/or memory 330) may perform a verification service associated with the service call prior to passing the service call to a service layer associated with the service, wherein the verification service includes verifying the service call based on comparing the service call identifier and the unique identifier, as described above in connection with reference number 130 of FIG. 1B and/or reference numbers 135, 140, and/or 145 of FIG. 1C. As an example, the server device 210 may compare the service call identifier to the unique identifier associated with the verification context.

As further shown in FIG. 4, process 400 may include selectively granting access to the service layer for the service call based on whether the service call identifier call matches the unique identifier (block 460). For example, the server device 210 (e.g., using processor 320 and/or memory 330) may selectively grant access to the service layer for the service call based on whether the service call identifier matches the unique identifier, as described above in connection with reference number 150 of FIG. 1D. As an example, the server device 210 may grant access to the service layer for the service call if the service call identifier matches the unique identifier and if the information indicated by the service call sufficiently matches the verification information. Alternatively, the server device 210 may deny access to the service layer for the service call if the service call identifier does not match the unique identifier or if the information indicated by the service call does not sufficiently match the verification information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for a portable verification context, the system comprising:
one or more memories; and
one or more processors, coupled to the one or more memories, configured to:
obtain verification information associated with an account based on a registration procedure associated with a service;
generate a verification context associated with the account based on the verification information;
encrypt the verification context with a unique identifier, wherein the unique identifier is generated by the system or is a device identifier of a device associated with the registration procedure;
obtain, from a different device than the device associated with the registration procedure, a service call associated with the service and the account, wherein the service call indicates a service call identifier associated with the service call;
perform, based on the service call identifier matching the unique identifier, a verification service associated with the service call prior to passing the service call to a service layer associated with the service, wherein the verification service includes verifying the service call based on comparing the service call identifier and the unique identifier, wherein the service layer is located between a user interface layer and a persistence layer, and wherein the one or more processors, to perform the verification service associated with the service call, are configured to:
perform, without performing another registration procedure with the different device, the verification service associated with the service call prior to passing the service call to the service layer associated with the service; and
selectively grant access to the service layer for the service call based on whether the service call identifier matches the unique identifier.

2. The system of claim 1, wherein the one or more processors are further configured to:
provide, to the device associated with the registration procedure, an indication of the unique identifier as part of the registration procedure.

3. The system of claim 1, wherein the verification service includes multiple steps, and wherein comparing the service call identifier and the unique identifier is a first step that is performed prior to any other steps of the multiple steps.

4. The system of claim 1, wherein the service call indicates information associated with the account, and wherein the one or more processors, to perform the verification service, are configured to:
determine that the service call identifier call matches the unique identifier; and
compare the information indicated by the service call and the verification information based on determining that the service call identifier matches the unique identifier.

5. The system of claim 4, wherein the one or more processors, to selectively grant access to the service layer for the service call, are configured to:
grant access to the service layer for the service call if the service call identifier matches the unique identifier and if the information indicated by the service call sufficiently matches the verification information; or
deny access to the service layer for the service call if the information indicated by the service call does not sufficiently match the verification information.

6. The system of claim 1, wherein the service call is obtained from the different device than the device associated with the registration procedure, and wherein the verification service is performed without performing another registration procedure with the different device based on the service call identifier matching the unique identifier.

7. The system of claim 1, wherein the registration procedure is associated with a first session with the service, and wherein the service call is associated with a second, subsequent session with the service.

8. A method for generating a portable verification context, comprising:
obtaining, by a device associated with a registration procedure, verification information associated with an account based on the registration procedure, the registration procedure associated with a service;
generating, by the device associated with the registration procedure, a verification context associated with the account based on the verification information, wherein the verification context is an object used to verify access attempts to the service;
storing, by the device associated with the registration procedure, the verification context in connection with a unique identifier;
obtaining, by the device associated with the registration procedure and from a different device than the device associated with the registration procedure, a request to access the service, wherein the request is associated with the account, and wherein the request indicates an identifier; and
performing, based on the identifier indicated by the request matching the unique identifier, by the device associated with the registration procedure, a verification service associated with the request prior to passing the request to a service layer associated with the service, wherein the verification service includes verifying the request based on whether the identifier indicated by the request matches the unique identifier, wherein the service layer is located between a user interface layer and a persistence layer, and wherein performing the verification service comprises performing, without performing another registration procedure with the different device, the verification service associated with the service call prior to passing the service call to the service layer associated with the service.

9. The method of claim 8, wherein the unique identifier is generated by the device associated with the registration procedure.

10. The method of claim 8, wherein the verification context includes at least one of:
the unique identifier,
a name of a user associated with the account,
personally identifiable information of the user,
one or more identification documents associated with the user, or
biometric information of the user.

11. The method of claim 8, wherein the verification service includes multiple steps, and wherein comparing the identifier indicated by the request and the unique identifier is a first step that is performed prior to any other steps of the multiple steps.

12. The method of claim 8, wherein the request indicates user information associated with the request, and wherein performing the verification service comprises:
determining that the identifier indicated by the request matches the unique identifier; and comparing the user information and the verification information based on determining that the identifier indicated by the request matches the unique identifier.

13. The method of claim 12, wherein the user information includes at least one of:
a name,
an image, or
biometric scan data.

14. The method of claim 8, wherein performing the verification service comprises:
granting access to the service layer for the request if the identifier indicated by the request matches the unique identifier and if user information indicated by the request sufficiently matches the verification information; or
denying access to the service layer for the request if the user information indicated by the request does not sufficiently match the verification information.

15. The method of claim 8, wherein the request is obtained from the different device, and wherein the verification service is performed without performing another registration procedure with the different device based on the identifier indicated by the request matching the unique identifier.

16. A non-transitory computer-readable medium storing a set of instructions, the set of instructions comprising:
one or more instructions that, when executed by one or more processors of a device associated with a registration procedure, cause the device associated with the registration procedure to:
receive verification information associated with an account to register the verification information with a service;
generate a verification context associated with the account based on the verification information, wherein the verification context includes a first device identifier of a client device associated with the account;
obtain, from the client device, a request to access the service, wherein the request indicates a second device identifier;
perform, based on the second device identifier matching the first device identifier, a verification service associated with the request prior to passing the request to a service layer associated with the service, wherein the verification service includes verifying the request based on whether the second device identifier matches the first device identifier, wherein the service layer is located between a user interface layer and a persistence layer, and wherein the one or more instructions, that cause the device associated with the registration procedure to perform the verification service associated with the service call, cause the device associated with the registration procedure to:
perform, without performing another registration procedure with the client device, the verification service associated with the service call prior to passing the service call to the service layer associated with the service; and
provide, to the service layer, information associated with the request to enable the service to be performed if the second device identifier matches the first device identifier and if the account is verified using the verification context.

17. The non-transitory computer-readable medium of claim 16, wherein the one or more instructions, that cause the device associated with the registration procedure to perform the verification service, cause the device associated with the registration procedure to:
receive the verification context from a storage location based on obtaining the request; and
proceed with the verification service if the second device identifier matches the first device identifier.

18. The non-transitory computer-readable medium of claim 16, wherein the request indicates user information associated with the request, and wherein performing the verification service comprises:
determine that the second device identifier matches the first device identifier; and
compare the user information and the verification information based on determining that the second device identifier matches the first device identifier.

19. The system of claim 1, wherein the verification context is applied to requests from different devices.

20. The non-transitory computer-readable medium of claim 18, wherein the user information includes at least one of:
a name, or
an image.

* * * * *